US009515841B2

(12) United States Patent
Wakeyama et al.

(10) Patent No.: US 9,515,841 B2
(45) Date of Patent: Dec. 6, 2016

(54) MONITORING SYSTEM

(71) Applicant: Panasonic Intellectual Property Management Co., Ltd., Osaka (JP)

(72) Inventors: Daisuke Wakeyama, Fukuoka (JP); Hiroshi Tsuji, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 14/704,540

(22) Filed: May 5, 2015

(65) Prior Publication Data

US 2016/0149721 A1     May 26, 2016

(30) Foreign Application Priority Data

Nov. 21, 2014  (JP) .................................. 2014-237046

(51) Int. Cl.
*H04B 1/38* (2015.01)
*H04L 12/28* (2006.01)
*G08B 13/196* (2006.01)
*G08B 29/18* (2006.01)

(52) U.S. Cl.
CPC ..... *H04L 12/2827* (2013.01); *G08B 13/19658* (2013.01); *G08B 13/19682* (2013.01); *G08B 29/188* (2013.01); *H04L 12/282* (2013.01); *H04L 2012/2841* (2013.01); *H04L 2012/2845* (2013.01); *H04L 2012/2849* (2013.01)

(58) Field of Classification Search
CPC .............. H04L 12/2827; H04L 12/282; H04L 2012/2841; H04L 2012/2845; H04L 2012/2849; G08B 13/19658; G08B 13/19682; G08B 29/188
USPC .......................... 455/412.1–414.2, 418–420, 41.1–41.2, 455/67.11, 456.1, 456.2, 550.1, 556.2, 552.1, 455/404.2, 572, 343.1; 370/328, 338, 252; 340/12.25, 12.28, 870.07, 538, 573.1, 340/539.1, 870.02, 870.03; 705/26.7, 347
See application file for complete search history.

(56) References Cited

U.S. PATENT DOCUMENTS 6,404,823 B1 * 6/2002 Grange ................. H03F 1/0222
330/10
6,762,686 B1 * 7/2004 Tabe ...................... G08B 25/08
340/541
(Continued)

FOREIGN PATENT DOCUMENTS

JP   2007-323533 A   12/2007
JP   2010-250680 A   11/2010
(Continued)

OTHER PUBLICATIONS

International Search Report and Written Opinion mailed Jul. 28, 2015, for corresponding International Application No. PCT/JP2015/001223, 12 pages.

*Primary Examiner* — Babar Sarwar
(74) *Attorney, Agent, or Firm* — Seed IP Law Group LLP

(57) ABSTRACT

A monitoring system includes at least one sensor, at least one monitoring camera, a power control apparatus, a master device that is connected to a fixed telephone network so as to perform calls to other fixed telephones, and a mobile phone terminal that is connected to other mobile phones via a mobile phone network. A master device instructs the power control apparatus to supply power depending on whether or not an event is detected by at least two of the sensors and the monitoring cameras, and the power control apparatus supplies power to the connected apparatus on the basis of a power supply instruction from the master device.

12 Claims, 11 Drawing Sheets

(56) References Cited

U.S. PATENT DOCUMENTS

| | | | |
|---|---|---|---|
| 7,076,504 B1* | 7/2006 | Handel | G06Q 30/02 705/14.39 |
| 7,155,305 B2* | 12/2006 | Hayes | G05B 15/02 340/447 |
| 7,424,733 B2* | 9/2008 | Kamiwada | H04L 12/2803 340/5.2 |
| 8,536,998 B1* | 9/2013 | Siu | H04L 12/2829 340/538 |
| 8,868,220 B2* | 10/2014 | Crucs | G05B 11/01 455/353 |
| 8,872,915 B1* | 10/2014 | Scalisi | H04N 7/186 348/140 |
| 9,247,378 B2* | 1/2016 | Bisson | H04W 4/021 |
| 2002/0180579 A1* | 12/2002 | Nagaoka | H04L 12/2803 340/3.1 |
| 2005/0227742 A1* | 10/2005 | Takeda | H04M 11/007 455/572 |
| 2006/0285653 A1* | 12/2006 | Leloup | H04M 1/72525 379/67.1 |
| 2008/0181172 A1* | 7/2008 | Angelhag | G01S 5/14 370/328 |
| 2010/0271996 A1* | 10/2010 | Leussink | H04W 52/0293 370/311 |
| 2011/0077012 A1* | 3/2011 | Lee | H04M 1/006 455/445 |
| 2011/0202181 A1* | 8/2011 | Lee | F24F 11/0009 700/276 |
| 2012/0229586 A1* | 9/2012 | Jackson | H04L 12/1818 348/14.01 |
| 2013/0084895 A1* | 4/2013 | Li | H04M 1/0258 455/462 |
| 2014/0068486 A1* | 3/2014 | Sellers | G06F 3/04847 715/771 |
| 2014/0140231 A1* | 5/2014 | Haiut | G01S 13/003 370/252 |
| 2014/0218517 A1* | 8/2014 | Kim | H04L 12/2818 348/143 |
| 2014/0287785 A1* | 9/2014 | Ashizuka | H04M 1/72505 455/464 |
| 2016/0149717 A1* | 5/2016 | Wada | H04L 12/4625 455/414.1 |

FOREIGN PATENT DOCUMENTS

| | | |
|---|---|---|
| JP | 2013-127822 A | 6/2013 |
| KR | 101436306 B1 | 9/2014 |

* cited by examiner

FIG. 10

| CAMERA (OUTDOOR DOOR) | SENSOR 1 (ENTRANCE) | SENSOR 2 (LIVINGROOM) | SENSOR 3 (BEDROOM) | SENSOR 4 (SECOND FLOOR) | SMART PLUG OPERATION | REMARK |
|---|---|---|---|---|---|---|
| ○ | | | | | NON-EXECUTION | JUST PRESENT IN FRONT OF HOUSE |
| ○ | ○ | | | | ENTRANCE ON | ENTER ENTRANCE |
| ○ | ○ | ○ | | | FIRST FLOOR ON | REGULAR ROUTE |
| ○ | ○ | | ○ | | FIRST FLOOR ON | REGULAR ROUTE |
| | | ○ | | ○ | SECOND FLOOR ON | REGULAR ROUTE |
| | | | ○ | | NON-EXECUTION | ENTER FROM HALFWAY |
| | | | | ○ | NON-EXECUTION | ENTER FROM HALFWAY |
| | | | | | NON-EXECUTION | ENTER FROM HALFWAY |

TB1

MONITORING SYSTEM

BACKGROUND OF THE INVENTION

1. Field of the Invention

The present invention relates to a monitoring system.

2. Description of the Related Art

In the related art, there is a monitoring system using a camera, a sensor, and the like (for example, refer to Japanese Patent Unexamined Publication No. 2007-323533). The monitoring system includes a monitoring device and a monitoring server.

The monitoring device includes image capturing means, sound input and output means, and target recognition means such as a human sensor. The image capturing means captures an image of a monitoring target in a monitoring space. The sound input and output means outputs sound to the monitoring target and receives sound from the monitoring target. The target recognition means outputs a target recognition signal when the monitoring target is recognized.

The monitoring server includes reception means, acquisition means, and communication means. The reception means receives the target recognition signal from the monitoring device. The acquisition means acquires video information captured by the image capturing means and audio information obtained through the sound input by the sound input and output means on the basis of the reception of the target recognition signal by the reception means. The communication means transmits a connection request to an information terminal of a registered user in a case where the target recognition signal is received by the reception means. The communication means transmits the video information and the audio information acquired by the acquisition means to the information terminal by using bidirectional communication between the monitoring device and the information terminal, established when the information terminal responds to the connection request, and receives video information and audio information from the information terminal and transmits the information to the monitoring device.

SUMMARY OF THE INVENTION

In Japanese Patent Unexamined Publication No. 2007-323533, a dedicated system is necessary as a monitoring system, and a lot of labor and cost are required to introduce a monitoring system. For example, if a smart plug is provided which automatically turns on a power source of lighting equipment or the like when a dweller returns home, and detection accuracy of a sensor is low, a target (for example, a person) may not be accurately recognized on the basis of detection performed by a single sensor (a human sensor or the like), and the power supply of the lighting equipment or the like may not be turned on. In this case, convenience of the monitoring system is not sufficient.

The present invention has been made in consideration of the circumstances, and provides a monitoring system, which is convenient to use, and which can improve a user's convenience at low cost by using an existing fixed telephone.

According to the present invention, there is provided a monitoring system including at least one sensor; at least one monitoring camera that includes a microphone, a speaker, and an image capturing unit; a power control apparatus that has a communication function, and supplies power to a connected apparatus or cuts off the supply of power; a master device that performs communication with the monitoring camera, the sensor, and the power control apparatus, and is connected to a fixed telephone network so as to perform calls to other fixed telephones; and a mobile phone terminal that performs wireless communication with the master device by using a wireless router, and is connected to other mobile phones via a mobile phone network, in which the master device instructs the power control apparatus to supply power depending on whether or not an event is detected by at least two of the sensors and the monitoring cameras, and in which the power control apparatus supplies power to the connected apparatus on the basis of a power supply instruction from the master device.

According to the present invention, it is possible to provide a monitoring system, which is convenient to use, and which can improve a user's convenience at low cost by using an existing fixed telephone.

BRIEF DESCRIPTION OF DRAWINGS

FIG. 10 is a schematic diagram illustrating an example of a setup table in the embodiment.

DETAILED DESCRIPTION OF THE PREFERRED EMBODIMENT

Hereinafter, an embodiment of the present invention will be described with reference to the drawings.

Figure 1:
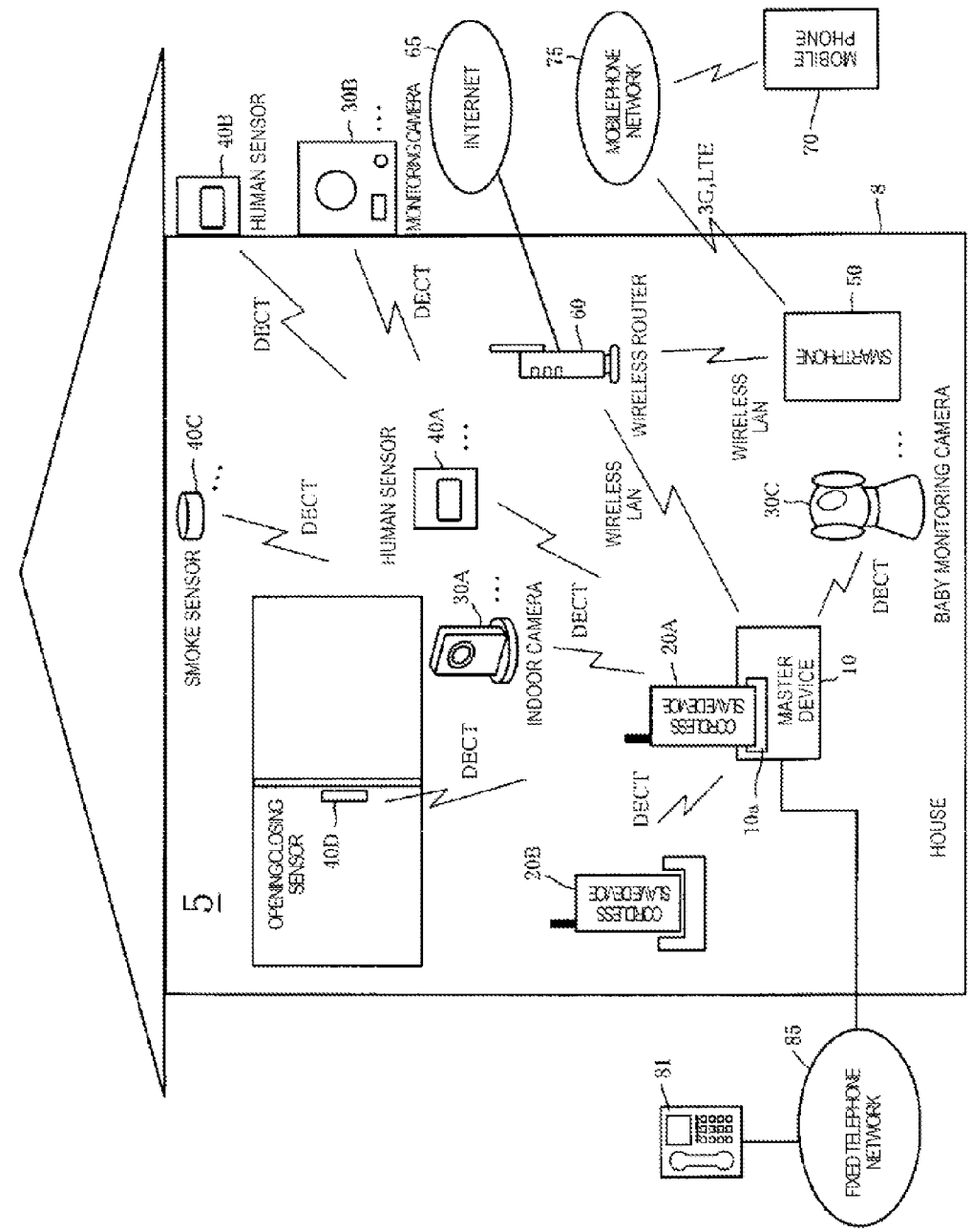
FIG. 1 is a diagram illustrating a system configuration of a monitoring camera system of an embodiment.

FIG. 1 is a diagram illustrating a system configuration of monitoring camera system 5 of the present embodiment. Monitoring camera system 5 is mainly provided in house 8, and includes master device 10, two cordless slave devices 20A and 20B (hereinafter, simply referred to as "slave devices"), a plurality of cameras 30 (specifically, indoor camera 30A, monitoring camera 30B, . . . ), various sensors 40 (specifically, human sensors 40A and 40B, smoke sensor 40C, opening/closing sensor 40D, . . . ), smartphone 50, wireless router 60, and a plurality of smart plugs (smart plug 80, . . . ). Although not illustrated in FIG. 1, each smart plug 80 is electrically connected to an electric apparatus (for example, an air conditioner or lighting equipment) which is disposed in the house. A configuration of monitoring camera system 5 is only an example and may be modified in various aspects.

Master device 10 which functions as a gateway in monitoring camera system 5 is a control device which controls the entire operation of monitoring camera system 5, and is connected to the slave devices, the cameras, the sensors, the smart plugs, and the like in a communicable manner by using a communication method such as digital enhanced cordless telecommunications (DECT). Master device 10 is connected to the Internet 65 via wireless router 60 using a wireless LAN. Master device 10 is connected to fixed telephone network 85 in a wired manner and can perform a call to fixed telephone 800. Master device 10 has a function of charging slave device 20A which is inserted into insertion port 10a.

Slave devices 20A and 20B are connected to master device 10 in the DECT communication method and can perform a call to master device 10. Particularly, in a case where two slave devices 20A and 20B are not required to be differentiated from each other, the slave devices are collectively referred to as slave device 20.

Various sensors 40 (specifically, human sensors 40A and 40B, smoke sensor 40C, opening/closing sensor 40D, . . . ) are connected to master device 10 in the DECT communication method. Herein, as sensors, opening/closing sensor 40D which detects opening and closing of a window, smoke sensor 40C which detects smoke, and human sensors 40A and 40B which detect a person with infrared rays are used. Particularly, in a case where the sensors are not required to be differentiated from each other, the sensors are collectively referred to as sensor 40. As will be described later, infrared sensor 313 (refer to FIG. 4) built into camera 30 is also used as a human sensor.

A plurality of cameras (specifically, indoor camera 30A, monitoring camera 30B, . . . ) have a call function and are connected to master device 10 in the DECT communication method. Herein, as cameras, monitoring camera 30B which captures an image of an outdoor environment, and indoor camera 30A which captures an image of house 8, are used. Particularly, in a case where the cameras are not required to be differentiated from each other, the cameras are collectively referred to as camera 30.

Smartphone 50 is connected to master device 10 via wireless router 60 using a wireless LAN, and is connected to mobile phone 70 or other smartphones via mobile phone network 75 using a communication method such as the third generation (3G) method, a high speed package access (HSPA) method, or a long term evolution (LTE) method.

Smart plugs 80 have a wireless communication function using DECT, and are connected to master device 10 by using a wireless communication method such as DECT. Smart plugs 80 are electrically connected to electric apparatuses (for example, an air conditioner, lighting equipment, camera 30, and sensor 40) disposed in house 8, and supply power to the electric apparatus which is connected to each smart plug 80 during an operation mode and do not supply power to the electric apparatus which is connected to each smart plug 80 during an operation stop mode.

Figure 2:
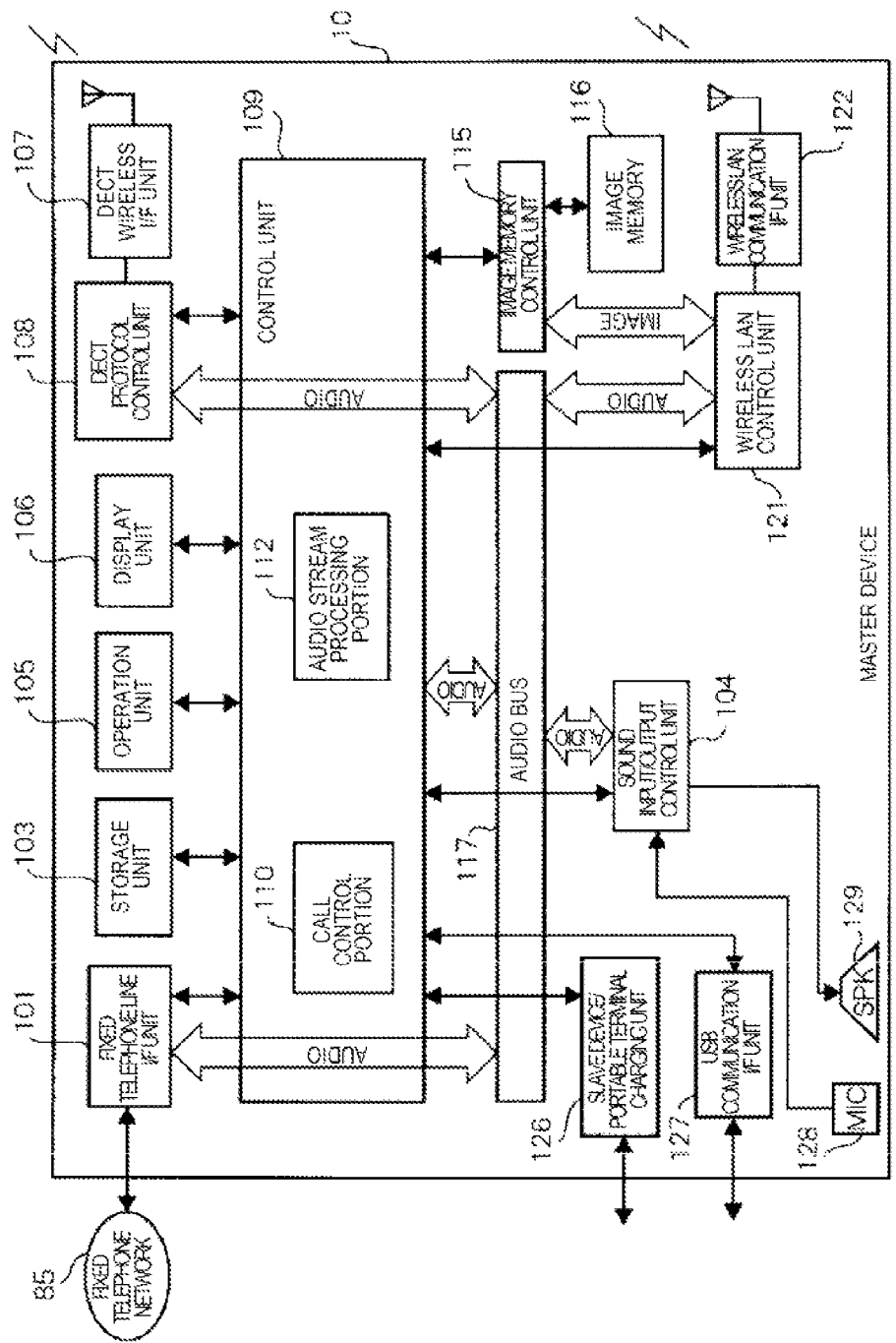
FIG. 2 is a block diagram illustrating an internal configuration of a master device of the embodiment.

FIG. 2 is a block diagram illustrating an internal configuration of master device 10. Master device 10 includes control unit 109, storage unit 103, operation unit 105, and display unit 106. Master device 10 receives various input operations and displays information such as an image on display unit 106. Control unit 109 has a call control portion 110 and an audio stream processing portion 112 built thereinto, and performs call control during calling, processing of audio data, and the like.

Master device 10 includes image memory control unit 115 and image memory 116, and stores image data or the like captured by camera 30 in image memory 116.

Master device 10 includes wireless LAN control unit 121 and wireless LAN communication I/F unit 122, and transmits and receives image data and audio data to and from smartphone 50, camera 30, and the like via wireless router 60 connected over a wireless LAN.

Master device 10 includes DECT protocol control unit 108 and DECT wireless I/F unit 107, and performs wireless connection to slave device 20, sensor 40, and camera 30 by using a wireless method such as digital enhanced cordless telecommunications (DECT).

Master device 10 includes audio bus 117, sound input/output control unit 104, speaker 129, and microphone 128, and performs input and output of sound to and from an external device.

Master device 10 includes fixed telephone line I/F unit 101, and can perform a call to external fixed telephone 800 connected to fixed telephone network 85.

Master device 10 includes slave device/portable terminal charging unit 126 and charges slave device 20 or smartphone 50 inserted into insertion port 10a.

Master device 10 includes USB communication I/F unit 127, and transmits and receives data to and from an apparatus, a memory, or the like having an interface of a universal serial bus (USB) standard.

Master device 10 registers pairs of various sensors 40 (specifically, human sensors 40A and 40B, smoke sensor 40C, and opening/closing sensor 40D) and the plurality of cameras 30 in storage unit 103 in correlation with each other. For example, human sensor 40B and monitoring camera 30B are installed at close locations outdoors and are thus registered in correlation with each other. Monitoring camera 30B, as will be described later, integrally has infrared sensor 313 (refer to FIG. 4) which is a human sensor and is built thereinto, and is thus also registered in correlation with infrared sensor 313. Human sensor 40A, smoke sensor 40C, and opening/closing sensor 40D are all installed inside house 8 and are thus registered in correlation with indoor camera 30A.

Figure 3:
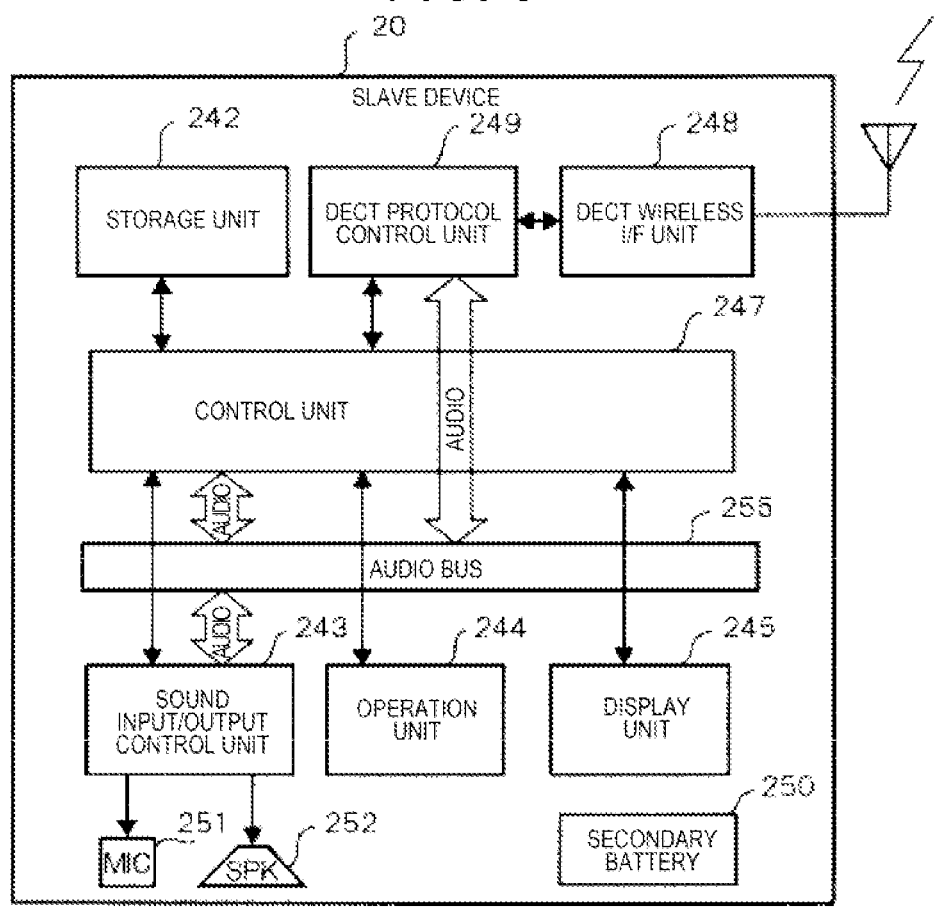
FIG. 3 is a block diagram illustrating an internal configuration of a cordless slave device of the embodiment.

FIG. 3 is a block diagram illustrating an internal configuration of (cordless) slave device 20. Slave device 20 includes control unit 247, storage unit 242, operation unit 244, and display unit 245. Slave device 20 receives various input operations and displays information such as an image on display unit 245.

Slave device 20 includes DECT protocol control unit 249 and DECT wireless I/F unit 248, and performs wireless connection to master device 10, sensor 40, and camera 30 by using a wireless method such as DECT.

Slave device 20 includes audio bus 255, sound input/output control unit 243, speaker 252, and microphone 251, and performs input and output of sound to and from an external device.

Slave device 20 includes secondary battery 250. Secondary battery 250 is rechargeable battery, and supplies power to each unit.

Figure 4:
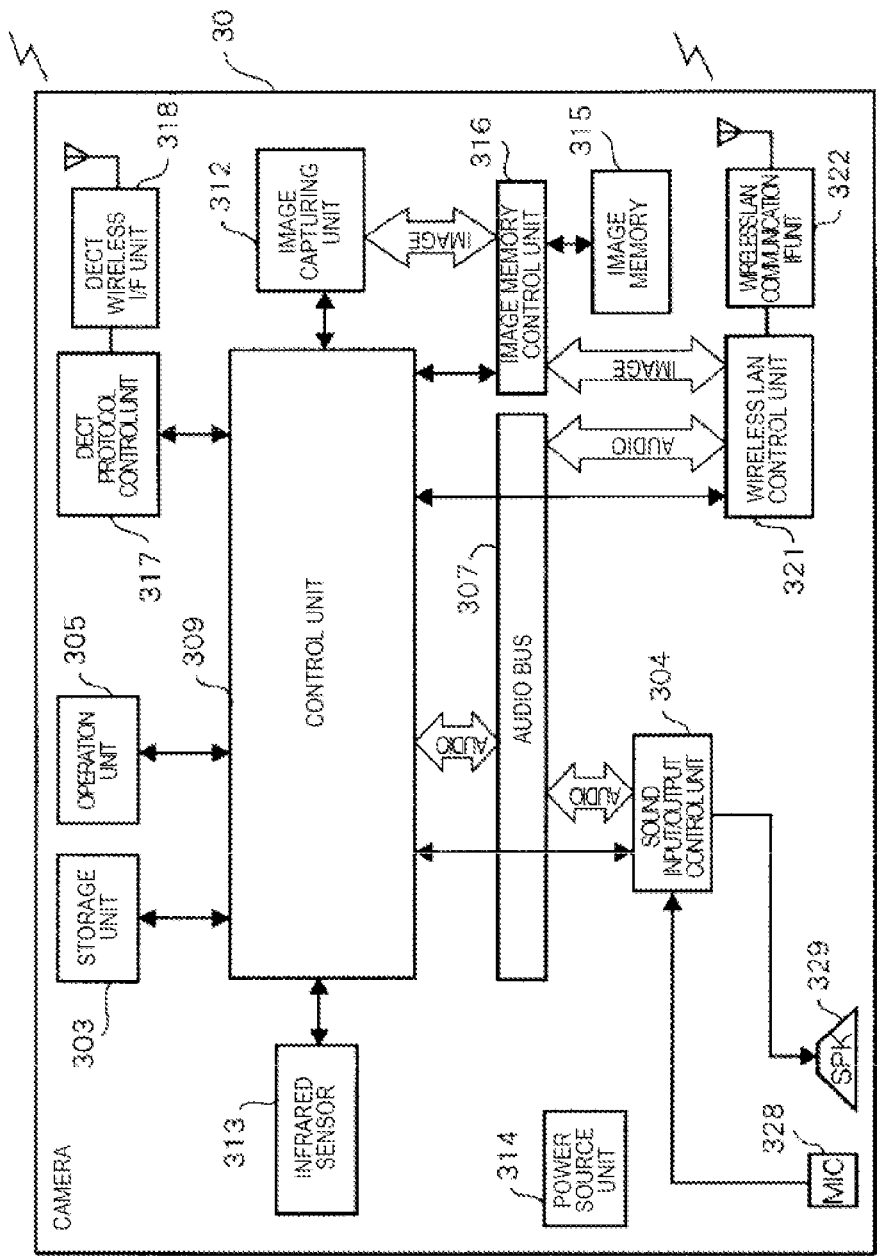
FIG. 4 is a block diagram illustrating an internal configuration of a camera of the embodiment.

FIG. 4 is a block diagram illustrating an internal configuration of camera 30. Indoor camera 30A and monitoring camera 30B as examples of cameras 30 have substantially the same configuration as each other. Camera 30 includes control unit 309, storage unit 303, and operation unit 305.

Camera 30 performs an operation related to image capturing and also receives input operations.

Camera 30 includes DECT protocol control unit 317 and DECT wireless I/F unit 318, and performs wireless connection to master device 10 by using a wireless method such as DECT.

Camera 30 includes wireless LAN control unit 321 and wireless LAN communication I/F unit 322, and transmits and receives image data and audio data to and from master device 10, smartphone 50, and the like via wireless router 60 connected over the wireless LAN.

Camera 30 includes audio bus 307, sound input/output control unit 304, speaker 329, and microphone 328, and performs input and output of sound to and from an external device.

Camera 30 includes image capturing unit 312, image memory control unit 316, and image memory 315, and stores image data captured by image capturing unit 312 in image memory 315. Image capturing unit 312 has a lens and an imaging element (for example, an image sensor such as a charged coupled device (CCD) or a complementary metal oxide semiconductor (CMOS)).

Camera 30 integrally has infrared sensor 313 which is a passive infrared (PIR) sensor as a human sensor built thereinto. Infrared sensor 313 detects the presence of a person by detecting a change in heat (infrared ray) generated by the person. Camera 30 includes a power source unit 314 which is constituted by a commercial AC power source.

Figure 5:
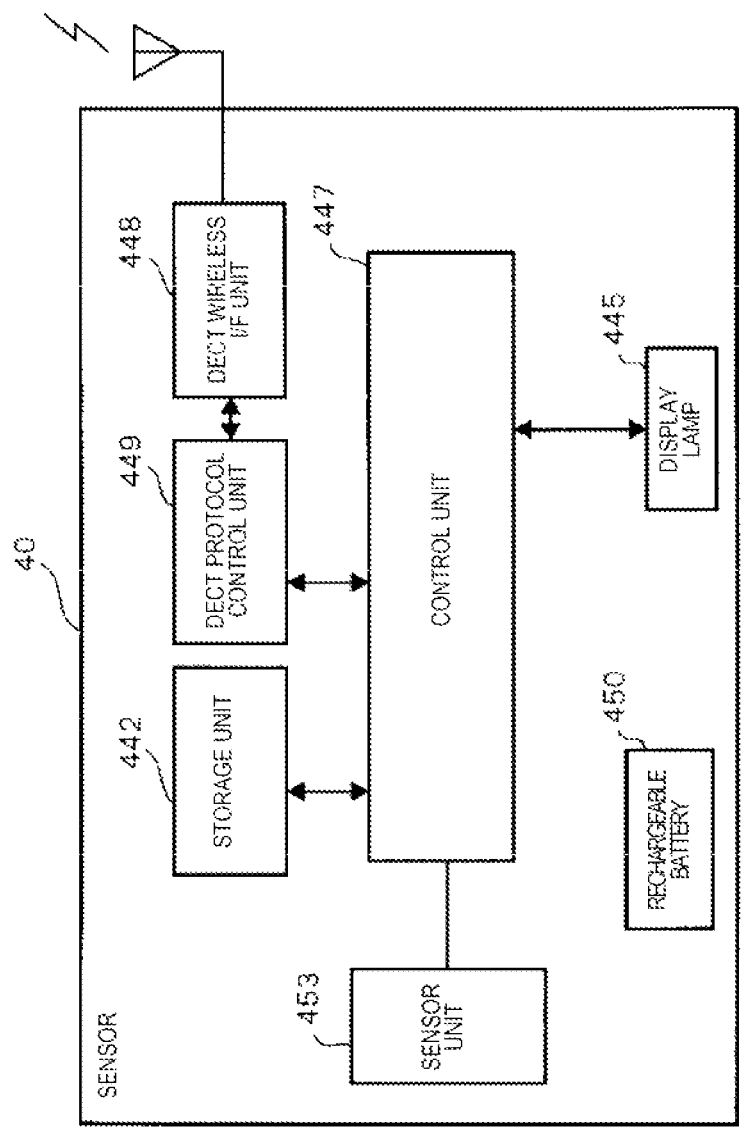
FIG. 5 is a block diagram illustrating an internal configuration of a sensor of the embodiment.

FIG. 5 is a block diagram illustrating an internal configuration of sensor 40. Sensor 40 includes control unit 447, storage unit 442, display lamp 445, and sensor unit 453. Sensor 40 performs a predetermined detection operation, such as turning on display lamp 445, in a case where a target (for example, an intruder which is also the same for the following description) is detected.

Sensor 40 includes DECT protocol control unit 449 and DECT wireless I/F unit 448, and performs wireless connection to master device 10 by using a wireless method such as DECT, and sends sensor detection information to master device 10 when a target is detected.

Sensor unit 453 differs depending on the kind of sensor 40. For example, in a case of human sensors 40A and 40B, sensor unit 453 is a PIR sensor which detects a person through a change in infrared rays. In a case of opening/closing sensor 40D which detects opening and closing of a front door, a window, or the like, sensor unit 453 is a reed switch which switches between turned-on and turned-off states due to opening and closing. In a case of smoke sensor 40C, sensor unit 453 is a light emitting/receiving unit which detects smoke when emitted light is blocked by the smoke.

Secondary battery 450 is a rechargeable battery and supplies power to each unit.

Figure 6:
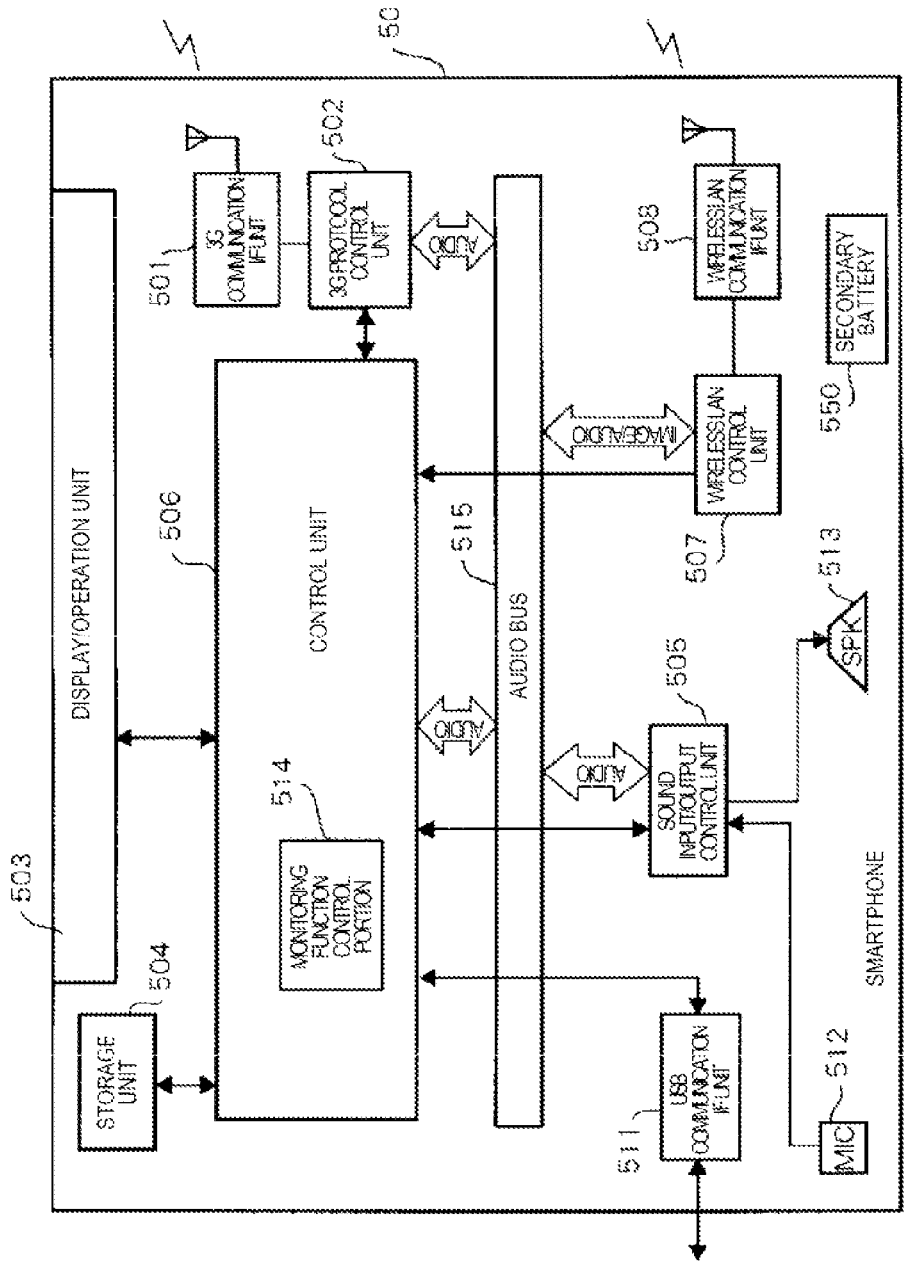
FIG. 6 is a block diagram illustrating an internal configuration of a smartphone of the embodiment.

FIG. 6 is a block diagram illustrating an internal configuration of smartphone 50. Smartphone 50 includes control unit 506, storage unit 504, and display/operation unit (touch panel) 503. Smartphone 50 receives various input operations and displays information such as an image on display/operation unit 503. A monitoring function control portion 514 which can set a function of camera 30 is built into control unit 506 as will be described later. Display/operation unit 503, which is a display/input unit into which a display unit and an operation unit are integrated, displays information such as an image or an icon on a screen, and receives a tap operation (or a touch operation) on a screen performed by a user.

Smartphone 50 includes 3G protocol control unit 502 and 3G wireless I/F unit 501, and performs wireless connection to mobile phone 70 or other smartphones connected to mobile phone network 75, by using a third generation (3G) wireless communication method.

Smartphone 50 includes audio bus 515, sound input/output control unit 505, speaker 513, and microphone 512, and performs input and output of sound to and from an external device.

Smartphone 50 includes wireless LAN control unit 507 and wireless LAN communication I/F unit 508, and transmits and receives image data and audio data to and from master device 10, camera 30, and the like via wireless router 60 connected over the wireless LAN.

Smartphone 50 includes USB communication I/F unit 511, and transmits and receives data to and from an apparatus, a memory, or the like having an interface of a universal serial bus (USB) standard.

Smartphone 50 includes secondary battery 550. Secondary battery 550 is a rechargeable battery and supplies power to each unit.

Figure 7:
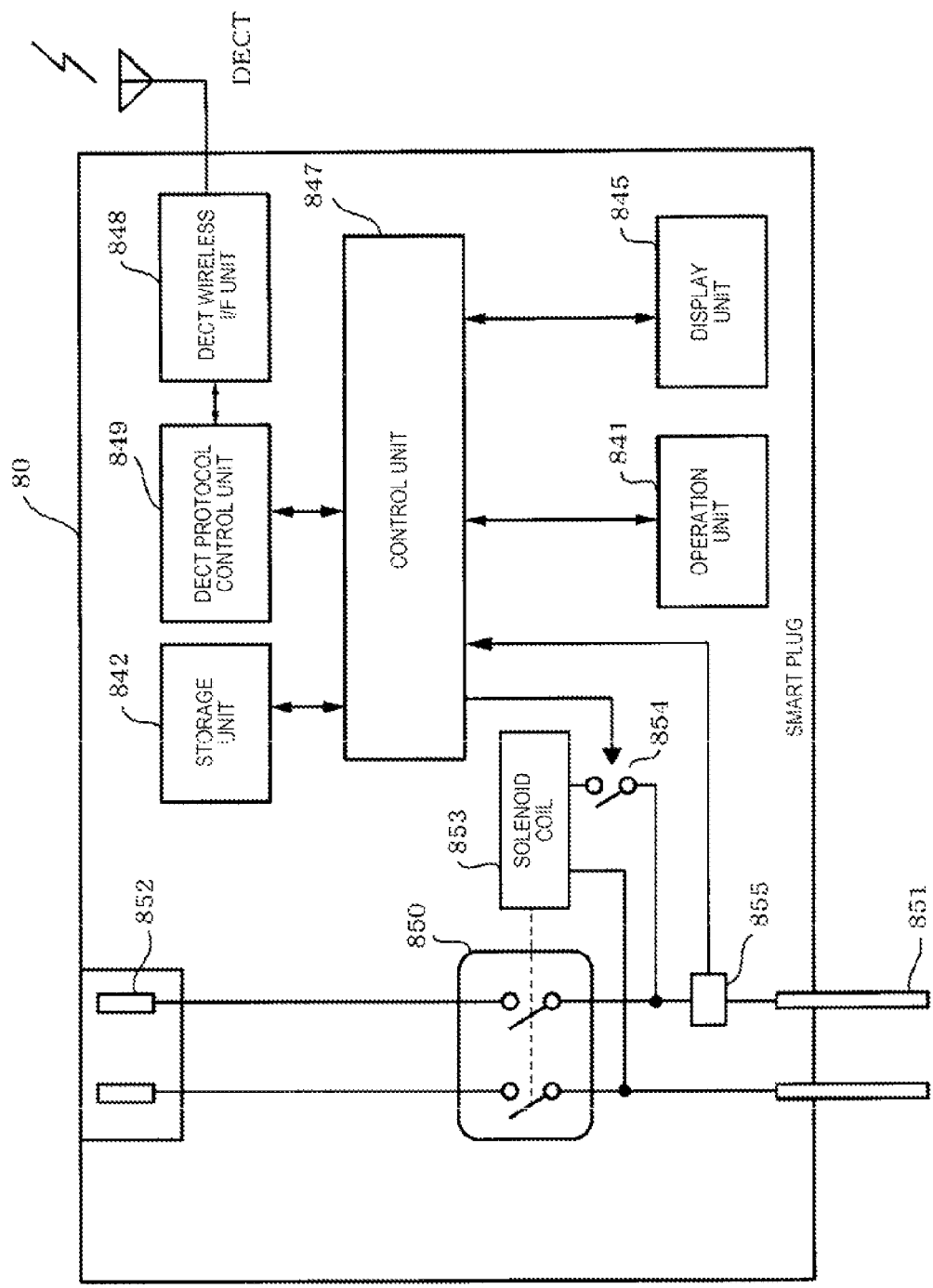
FIG. 7 is a block diagram illustrating an internal configuration of a smart plug of the embodiment.

FIG. 7 is a block diagram illustrating an internal configuration of smart plug 80. Smart plug 80 is connected to the camera or other apparatuses.

Smart plug 80 includes control unit 847, storage unit 842, and display unit 845 having a display lamp. For example, On (power supply) and Off (power supply cutoff) condition settings which can be set or changed by smart plug 80 performing communication with smartphone 50 or master device 10 are registered in storage unit 842.

Smart plug 80 includes DECT protocol control unit 849 and DECT wireless I/F unit 848, and performs wireless connection to master device 10 by using a wireless method such as DECT, and switches supply and cutoff of commercial AC power to each apparatus connected to smart plug 80.

Smart plug 80 includes switch unit 850. Switch unit 850 performs connection or disconnection between plug terminals 851 and socket terminals 852. Switch unit 850 is driven by solenoid coil 853. Switch unit 850 is closed when a driving current flows through solenoid coil 853 from an AC power source, and thus plug terminals 851 are electrically connected to socket terminals 852. Switch unit 854 causes a driving current to or not to flow through solenoid coil 853 under the control of control unit 847.

Current detection element 855 is provided between plug terminals 851 and switch unit 850. When a current flows between plug terminals 851 and socket terminals 852, current detection element 855 detects the current and sends a detection signal to control unit 847. Plug terminals 851 may be connected to various apparatuses (for example, lighting equipment, an air conditioner, and electronic apparatuses).

Next, an operation of monitoring camera system 5 will be described.

Figure 8:
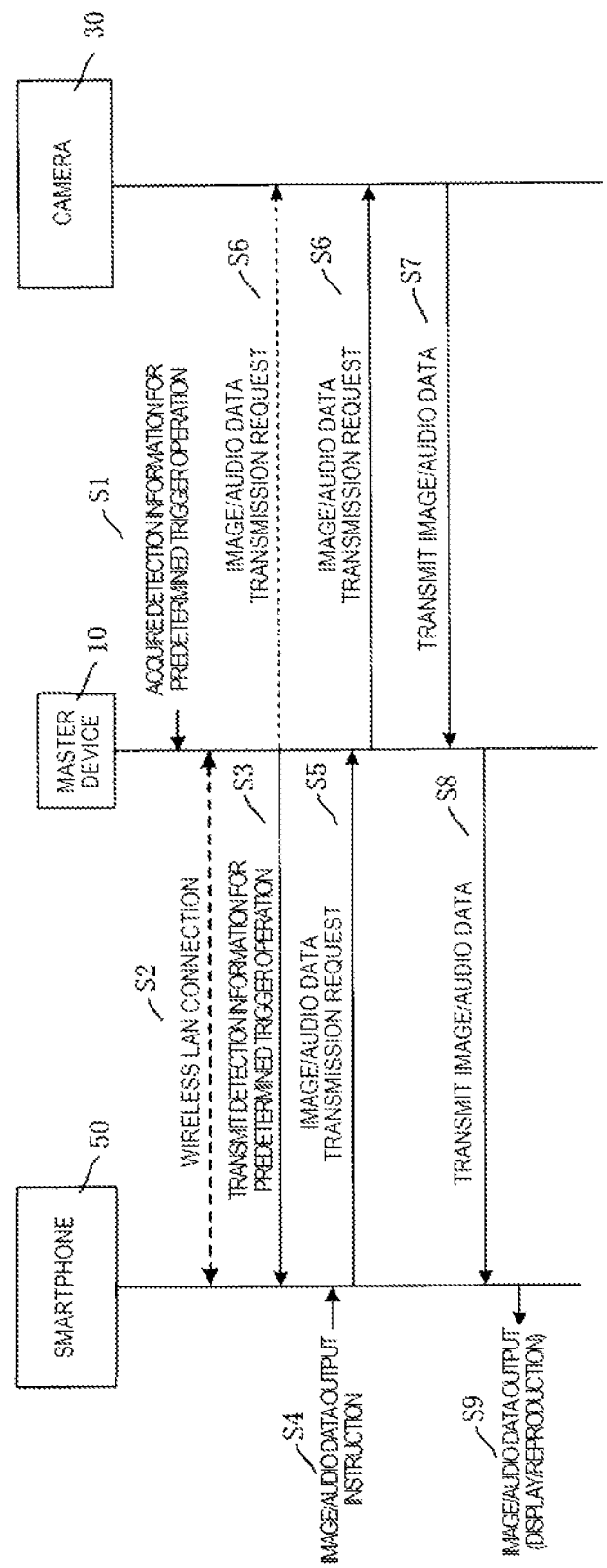
FIG. 8 is a sequence diagram illustrating an operation example of the monitoring camera system in a case where the smartphone acquires image data or audio data from the camera and then outputs the data in the embodiment.

FIG. 8 is a sequence diagram illustrating an operation example of monitoring camera system 5 in a case where smartphone 50 acquires image data or audio data from camera 30 and then outputs the data.

For example, it is assumed that a home security application corresponding to monitoring camera system 5 is installed in smartphone 50 in advance, and this application is activated by a user's input operation.

If detection information (information regarding detection performed by, for example, sensor unit 453 of each sensor 40 or infrared sensor 313 of camera 30) for a predetermined trigger operation is acquired (step S1), master device 10 performs a wireless communication connection to smartphone 50 by using a wireless LAN (step S2). If the wireless LAN connection to smartphone 50 has been completed, master device 10 transmits the detection information (refer to the above description) for the predetermined trigger operation to smartphone 50 (step S3).

If an image/audio data output instruction operation is received from the user (step S4), smartphone 50 transmits image/audio data transmission request information (step S5). If the image/audio data transmission request information is received from smartphone 50, master device 10 requests camera 30 to transmit image/audio data (step S6).

Master device 10 may transmit the detection information (refer to the above description) for the predetermined trigger operation to smartphone 50 and may also request camera 30 to transmit image/audio data (step S6).

If the image/audio data transmission request is received from master device 10, camera 30 performs a wireless communication connection to master device 10 by using the wireless LAN, and acquires image data captured by image capturing unit 312 and audio data collected by microphone 328 and transmits the data to master device 10 (step S7). Master device 10 transmits the image data and the audio data transmitted from camera 30 to smartphone 50 (step S8).

Smartphone 50 displays the image data transmitted from master device 10 on display/operation unit 503, and outputs the audio data transmitted from master device 10 from speaker 513 (step S9). Consequently, the user of smartphone 50 can display a monitoring screen including the image data from camera 30 and outputs the audio data from camera 30 as sound. The monitoring screen may include image data from the plurality of cameras 30.

Next, a description will be made of an example in which smartphone 50 sets setup information in master device 10.

Figure 9:
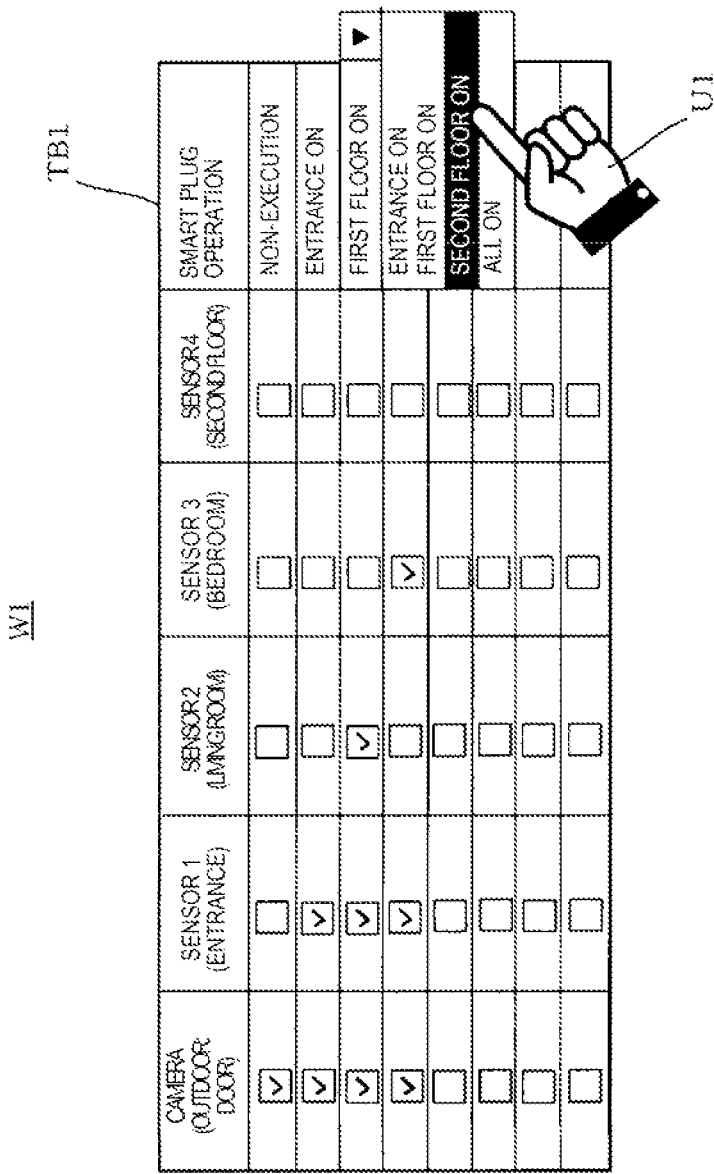
FIG. 9 is a schematic diagram illustrating an example of a setting screen of the smartphone for generating a setup table in the embodiment.

Smartphone 50 specifies an operation of master device 10 in a case where master device 10 receives sensor detection information from at least one camera 30, at least one sensor 40, or the like. Smartphone 50 receives an input operation performed on display/operation unit 503 by a user U1, and generates information regarding a combination of apparatuses (camera 30 and sensor 40) which transmit sensor detection information to master device 10 and information regarding an operation of master device 10 performed on the combination as setup information (for example, setup table TB1). FIG. 9 is a schematic diagram illustrating an example of a setting screen W1 of smartphone 50 for generating setup table TB1.

Monitoring camera 30B and sensors 40 (for example, sensor 1, sensor 2, sensor 3, and sensor 4) are registered in setup table TB1 as examples of apparatuses which detect various events. Monitoring camera 30B is provided, for example, around a door used when the user gets in and out of house 8. Sensor 1 is provided at, for example, an entrance of house 8. Sensor 2 is provided in, for example, a living room of house 8. Sensor 3 is provided in, for example, a bedroom of house 8. The entrance, the living room, and the bedroom are located in the first floor of house 8. Sensor 4 is provided in, for example, at least one of rooms in the second floor of house 8. Sensors 1 to 4 may be human sensors 40A and 40B, smoke sensor 40C, and opening/closing sensor 40D, and may be other sensors. Information pieces regarding installation locations of sensors 1 to 4 are correlated with, for example, identification information pieces of sensors 1 to 4, and are held in master device 10 or the like.

In setup table TB1, operations of master device 10 include, for example, an instruction for causing smart plug 80 provided at the entrance to supply power (indicated by "entrance ON" in FIG. 9), an instruction for causing smart plug 80 provided in the first floor to supply power (indicated by "first floor ON" in FIG. 9), and an instruction for causing smart plug 80 provided in the second floor to supply power (indicated by "second floor ON" in FIG. 9). Operations of master device 10 include, for example, an instruction for causing smart plugs 80 provided in house 8 including the entrance, the first floor, and the second floor to supply power (indicated by "all ON" in FIG. 9), and a non-instruction for causing smart plugs 80 provided in house 8 including the entrance, the first floor, and the second floor to supply power (indicated by "non-instruction" in FIG. 9).

Smart plugs 80 supply power to various apparatuses connected to smart plugs 80 on the basis of a power supply instruction from master device 10. When power is supplied by smart plugs 80, power is supplied to various apparatuses (for example, lighting equipment and an air conditioner) connected to smart plugs 80, and the various apparatuses operate. Smart plugs 80 are provided at respective locations (for example, an entrance, the first floor, and respective rooms passages of the second floor) of house 8. A plurality of smart plugs 80 may be provided in each room.

When the generation of the setup information has been completed, smartphone 50 transmits the setup information to master device 10. If the setup information is acquired from smartphone 50, master device 10 stores the setup information in storage unit 103. If sensor identification information of sensors 1 to 4 or sensor detection information indicating that various events have been detected is received from monitoring camera 30B or sensors 1 to 4, master device 10 refers to the setup information and executes an operation corresponding to a combination of apparatuses which have detected the event. FIG. 10 is a schematic diagram illustrating an example of generated setup table TB1. Events may include, for example, a person detection event, a smoke detection event, and an opening event of an entrance door or a window, and may include other events.

Master device 10 acquires sensor detection information indicating that a person has been detected from monitoring camera 30B, for example. In this case, monitoring camera 30B determines the presence or absence of a person in a captured image, for example, through a predetermined image process, and notifies master device 10 of the sensor detection information including a determination result.

Master device 10 acquires, for example, sensor detection information indicating that a person has been detected, sensor detection information indicating that smoke has been detected, or sensor detection information indicating that the entrance door or the window is open, from any one of sensors 1 to 4.

If sensor detection information is acquired from monitoring camera 30B or sensor 40, master device 10 performs control so that all or some of the smart plugs 80 supply power or do not supply power according to a combination of apparatuses which have transmitted the sensor detection information.

As illustrated in FIG. 10, in setup table TB1, in a case where master device 10 does not receive sensor detection information from sensors 1 to 4 but receives sensor detection information from monitoring camera 30B, master device 10 does not instruct smart plugs 80 provided in house 8 to supply power. Consequently, it is possible to prevent power sources of the various apparatuses of house 8 from being turned on and thus the apparatuses from being activated in a case where there is simply a person around the door, or there is a person passing the vicinity of the door.

In a case where master device 10 does not receive sensor detection information from sensors 2 to 4 but receives sensor detection information from monitoring camera 30B and sensor 1, master device 10 instructs smart plug 80 provided at the entrance to supply power. A difference between time points at which sensor detection information pieces are received from monitoring camera 30B and sensor 1 is within a predetermined time T1 (for example, five minutes). Here, in a case where a person is detected around the door by monitoring camera 30B, and an event is detected at the entrance by sensor 1 within the predetermined time T1, for example, this is considered as a typical behavior (regular route) of a dweller when the dweller returns home. In this case, master device 10 causes smart plug 80 of the entrance to supply power, and thus various apparatuses can be activated without a user's operation, and thus it is possible to improve user's convenience.

In a case where an event is detected at the entrance by sensor 1 and a person is detected around the door by monitoring camera 30B within the predetermined time T1, for example, this is considered as a typical behavior (regular route) of a dweller when the dweller is out, and thus master device 10 and smart plug 80 can perform the same operation as described above. Therefore, an order of detection of an event may not be taken into consideration in determination of necessity of power supply of smart plug 80.

In a case where master device 10 does not receive sensor detection information from sensors 3 and 4 but receives sensor detection information from monitoring camera 30B and sensors 1 and 2, master device 10 instructs smart plugs 80 provided in the first floor to supply power. A difference between time points at which sensor detection information pieces are received from monitoring camera 30B and sensors 1 and 2 is within a predetermined time T1 (for example, five minutes). Here, in a case where a person is detected around the door by monitoring camera 30B, and an event is detected at the entrance by sensor 1 and an event is detected at the living room by sensor 2 within the predetermined time T1, for example, this is considered as a typical behavior of a dweller when the dweller returns home. In this case, master device 10 causes smart plugs 80 of the first floor including the living room to supply power, and thus various apparatuses can be activated without a user's operation, and thus it is possible to improve user's convenience.

In a case where master device 10 does not receive sensor detection information from sensors 2 and 4 but receives sensor detection information from monitoring camera 30B and sensors 1 and 3, master device 10 instructs smart plugs 80 provided in the first floor to supply power. A difference between time points at which sensor detection information pieces are received from monitoring camera 30B and sensors 1 and 3 is within a predetermined time T1 (for example, five minutes). Here, in a case where a person is detected around the door by monitoring camera 30B, and an event is detected at the entrance by sensor 1 and an event is detected at the bedroom by sensor 3 within the predetermined time T1, for example, this is considered as a typical behavior of a dweller when the dweller returns home. In this case, master device 10 causes smart plugs 80 of the first floor including the bedroom to supply power, and thus various apparatuses can be activated without a user's operation, and thus it is possible to improve user's convenience.

In a case where master device 10 does not receive sensor detection information from sensors 2 and 3 but receives sensor detection information from monitoring camera 30B and sensors 1 and 4, master device 10 instructs smart plugs 80 provided in the second floor to supply power. A difference between time points at which sensor detection information pieces are received from monitoring camera 30B and sensors 1 and 4 is within a predetermined time T1 (for example, five minutes). Here, in a case where a person is detected around the door by monitoring camera 30B, and an event is detected at the entrance by sensor 1 and an event is detected in the second floor by sensor 4 within the predetermined time T1, for example, this is considered as a typical behavior of a dweller when the dweller returns home. In this case, master device 10 causes smart plugs 80 of the second floor to supply power, and thus various apparatuses can be activated without a user's operation, and thus it is possible to improve user's convenience.

In a case where master device 10 does not receive sensor detection information from monitoring camera 30B and sensors 1, 3 and 4 but receives sensor detection information from sensor 2, the master device 10 does not instruct smart plugs 80 provided in house 8 to supply power. Here, in a case where a person is not detected around the door by monitoring camera 30B, and an event is suddenly detected at the living room by sensor 2, for example, this is different from a typical behavior of a dweller when the dweller returns home. In this case, since there is a possibility that a suspicious person may enter the living room from halfway without using the regular route, master device 10 causes smart plugs 80 of house 8 not to supply power, and thus it is possible to prevent various apparatuses from being activated unintentionally.

In a case where master device 10 does not receive sensor detection information from monitoring camera 30B and sensors 1, 2 and 4 but receives sensor detection information from sensor 3, master device 10 does not instruct smart plugs 80 provided in house 8 to supply power. Here, in a case where a person is not detected around the door by monitoring camera 30B, and an event is suddenly detected at the bedroom by sensor 3, for example, this is different from a typical behavior of a dweller when the dweller returns home. In this case, since there is a possibility that a suspicious person may enter the bedroom from halfway without using the regular route, master device 10 causes smart plugs 80 of house 8 not to supply power, and thus it is possible to prevent various apparatuses from being activated unintentionally.

In a case where master device 10 does not receive sensor detection information from monitoring camera 30B and sensors 1 to 3 but receives sensor detection information from sensor 4, master device 10 does not instruct smart plugs 80 provided in house 8 to supply power. Here, in a case where a person is not detected around the door by monitoring camera 30B, and an event is suddenly detected in the second floor by sensor 4, for example, this is different from a typical behavior of a dweller when the dweller returns home. In this case, since there is a possibility that a suspicious person may enter the second floor from halfway without using the regular route, master device 10 causes smart plugs 80 of house 8 not to supply power, and thus it is possible to prevent various apparatuses from being activated unintentionally.

Figure 11:
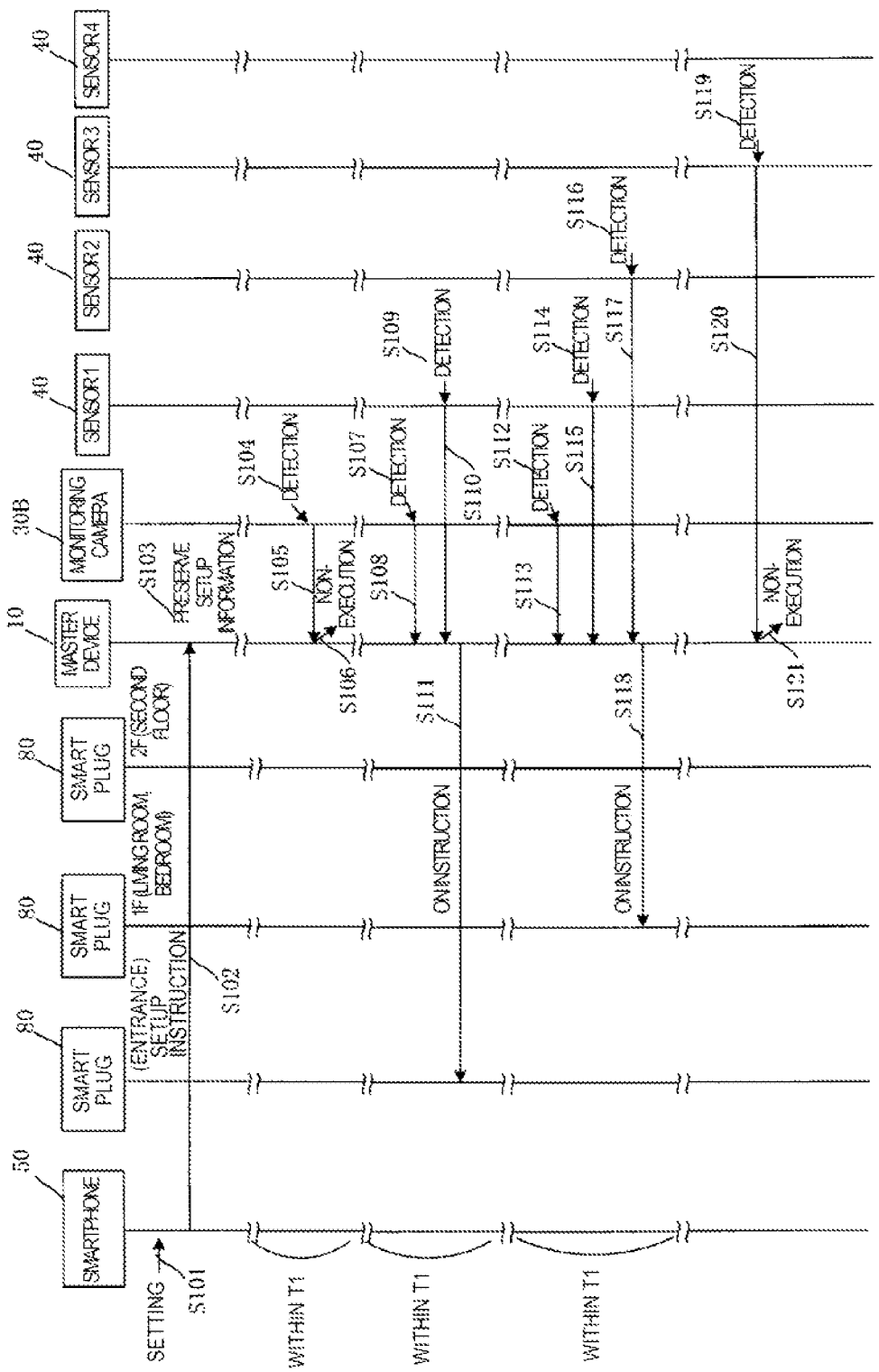
FIG. 11 is a sequence diagram illustrating an operation example of the monitoring camera system when setup information is set and various events are detected in the embodiment.

FIG. 11 is a sequence diagram illustrating an operation example of monitoring camera system 5 when setup information is set and various events are detected.

First, smartphone 50 generates setup information (for example, setup table TB1), for example, through the generation procedure illustrated in FIG. 9 (step S101), and transmits an instruction (setup instruction) for preserving the setup information in master device 10 to master device 10 (step S102). If the setup instruction is received from smartphone 50, master device 10 preserves the setup information in storage unit 103 or the like (step S103).

After the setup information is preserved in master device 10, master device 10 performs predetermined operations in relation to various events.

For example, if an event is detected (for example, person detection) (step S104), monitoring camera 30B transmits sensor detection information to master device 10 (step S105). If the sensor detection information is received from monitoring camera 30B and then other sensor detection information pieces are not received within the predetermined time T1, master device 10 refers to the setup information and does not instruct smart plugs 80 provided in house 8 to supply power on the basis of the sensor detection information from monitoring camera 30B (step S106).

For example, if an event is detected (for example, person detection) (step S107), monitoring camera 30B transmits sensor detection information to master device 10 (step S108). If an event is detected (for example, person detection) (step S109), sensor 1 transmits sensor detection information to master device 10 (step S110). If the sensor detection information from monitoring camera 30B and the sensor detection information from sensor 1 are received within the predetermined time T1, master device 10 refers to the setup information and instructs smart plug 80 provided at the entrance to supply power (ON instruction) (step S111). If the instruction from master device 10 is received, smart plug 80 provided at the entrance supplies power to various apparatuses connected to smart plug 80.

For example, if an event is detected (for example, person detection) (step S112), monitoring camera 30B transmits sensor detection information to master device 10 (step S113). If an event is detected (for example, person detection) (step S114), sensor 1 transmits sensor detection information to master device 10 (step S115). If an event is detected (for example, person detection) (step S116), sensor 2 transmits sensor detection information to master device 10 (step S117). If sensor detection information pieces from monitoring camera 30B, and sensors 1 and 2 are received within the predetermined time T1, master device 10 refers to the setup information and instructs smart plug 80 provided in the first floor to supply power (ON instruction) (step S118). If the instruction from master device 10 is received, smart plug 80 provided in the first floor supplies power to various apparatuses connected to smart plug 80.

For example, if an event is detected (for example, person detection) (step S119), sensor 3 transmits sensor detection information to master device 10 (step S120). In a case where the sensor detection information is received from sensor 3 and then other sensor detection information pieces are not received within the predetermined time T1, master device 10 refers to the setup information and does not instruct smart plugs 80 provided in house 8 to supply power on the basis of the sensor detection information from sensor 3 (step S121).

As mentioned above, in monitoring camera system 5, for example, in a system including a plurality of sensors 40 and cameras 30, a user can set timing for starting power supply of smart plug 80 in a state in which the plurality of sensors 40 or cameras 30 perform detection. In monitoring camera system 5, it is possible to variably set a combination of sensors 40 which cause the smart plugs to supply power when an event is detected, and thus to provide a system which is convenient to use. Particularly, it is possible to turn on lamps or the like in a necessary area such as from the entrance to the living room or from the entrance to the second floor. For example, in a case where a dweller temporarily returns to house 8 for something left behind and is out again, it is possible to prevent unnecessary lamps or the like from being turned on.

The present invention is not limited to the configuration of the embodiment, and is applicable to any configuration which can realize functions recited in the claims or functions of the configuration of the present embodiment.

The above-described embodiment has exemplified that master device 10 determines whether or not power supply is performed on the basis of the setup information, but master device 10 may determines whether or not cutoff of power supply is performed. For example, in a case where master device 10 can determine timing at which a dweller is out according to a combination of event detections of sensors 40, master device 10 may instruct smart plug 80 to cut off power supply. Consequently, it is possible to cut off operations of various apparatuses without a user's operation and thus to improve user's convenience.

In the above-described embodiment, a single monitoring camera 30B has been exemplified as camera 30 which detects an event and is registered in setup table TB1, but a plurality of monitoring cameras 30B may be used. Camera 30 registered in setup table TB1 may be one or more cameras 30 other than monitoring camera 30B. In other words, for example, any one of rooms of house 8 may be an event detection target of indoor camera 30.

In the above-described embodiment, a description has been made of an example in which sensors 40 are provided at the entrance, the first floor, and the second floor, but sensors 40 may be provided at other locations (for example, other floors, outdoor locations (a garden or the like)).

The above-described embodiment has exemplified a combination in a case where the number of sensors 40 which detect events is three or less, but a combination of four or more sensors 40 may be considered.

As mentioned above, monitoring camera system 5 includes at least one sensor 40, at least one camera 30, smart plug 80, master device 10, and smartphone 50. Camera 30 includes microphone 328, speaker 329, and image capturing unit 312. Smart plug 80 has a call function, and supplies power to a connected apparatus or cuts off the supply of power thereto. Master device 10 can perform communication with camera 30, sensor 40, and smart plug 80, and is connected to fixed telephone network 85 so as to perform fixed telephone 800. Smartphone 50 can perform wireless communication with master device 10 by using the wireless router, and is connected to mobile phone 70 via mobile phone network 75. Master device 10 instructs smart plug 80 to supply power depending on whether or not an event is detected by at least two of sensors 40 and cameras 30, and smart plug 80 supplies power to a connected apparatus on the basis of a power supply instruction from master device 10.

Monitoring camera system 5 is an example of a monitoring system. Camera 30 is an example of a monitoring camera. Smart plug 80 is an example of a power control apparatus. Smartphone 50 is an example of a mobile phone terminal.

Consequently, a dedicated system is not necessary, and monitoring camera system 5 can be built by using existing sensor 40, camera 30, and smartphone 50. Therefore, much labor and cost are not required to introduce monitoring camera system 5. For example, even in a case where a single sensor 40 is used and detection accuracy is low, since various apparatuses can be activated according to a plurality of sensor detections, it is possible to improve user's convenience without a user performing a special operation.

In monitoring camera system 5, smartphone 50 may generate setup information in which an operation of master device 10 is specified depending on whether or not sensor 40 and camera 30 detect an event and may transmit the setup information to master device 10. Master device 10 may receive and preserve the setup information from smartphone 50 and may operate according to the setup information.

Consequently, a user of smartphone 50 can arbitrarily set a behavior of master device 10 after an event is detected on the basis of which camera 30 or sensor 40 has detected the event.

In monitoring camera system 5, master device 10 may designate smart plug 80 which is instructed to supply power according to an installation location of sensor 40 or camera 30 which has detected an event, and may instruct the designated smart plug 80 to supply power depending on whether or not an event is detected by at least two of sensors 40 and cameras 30. Designated smart plug 80 may supply power to a connected apparatus on the basis of the power supply instruction from master device 10.

Consequently, it is possible to designate a location where various apparatuses are activated according to, for example, a behavior or a dweller and thus to improve user's convenience. Power is not supplied to apparatuses at a location where a dweller is estimated not to be present, and thus it is possible to reduce power consumption.

In monitoring camera system 5, master device 10 may instruct smart plug 80 to cut off the supply of power depending on whether or not an event is detected by at least two of sensors 40 and cameras 30. Smart plug 80 may cut off the supply of power to a connected apparatus on the basis of the power supply cutoff instruction from master device 10.

Consequently, for example, even in a case where a single sensor 40 is used and detection accuracy is low, since operations of various apparatuses can be stopped according to a plurality of sensor detections, it is possible to improve user's convenience without a user performing a special operation. For example, even in a case where a user forgets turning off a power source of an apparatus when the user is out, it is possible to turn off the power source of the apparatus according to detection of a sensor, and thus to reduce power consumption.

What is claimed is:

1. A monitoring system comprising:
    a plurality of sensors each configured to detect a defined event,
    a power controller connectable via a plug terminal to an electronic device to supply power or stop supply of power to the electronic device; and
    a master device that, in operation, performs wireless communication with the plurality of sensors and the power controller and is connected to a fixed telephone network to communicate with other fixed telephones, wherein the master device includes a memory device,
    wherein the master device, in operation, receives operation setting information, via a wireless router, from a smartphone that is communicably connectable to a mobile phone network to communicate with other mobile telephones, wherein the operation setting information defines how the power controller operates in response to a combination of at least two detection signals received from at least two of the sensors having detected at least two defined events,
    the master device, when receiving the operation setting information, stores the operation setting information in the memory device,
    the master device, when receiving the at least two detection signals from the at least two of the sensors having detected the at least two defined events and according to the operation setting information, transmits a power supply instruction to the power controller, and
    the power controller, based on the power supply instruction received from the master device, supplies power to the connected electronic device.

2. The monitoring system of claim 1, wherein the master device, in operation, sets the combination of at least two detection signals, in response to which the power supply instruction is transmitted.

3. The monitoring system of claim 2,
    wherein the master device transmits a stop power supply instruction to the power controller depending on whether a combination of at least two detection signals received from at least two of the sensors having detected at least two defined events is present or absent, and
    the power controller, based on the stop power supply instruction received from the master device, stops supply of power to the connected electronic device.

4. The monitoring system of claim 1,
    wherein the master device transmits a stop power supply instruction to the power controller depending on whether a combination of at least two detection signals received from at least two of the sensors having detected at least two defined events is present or absent, and
    the power controller, based on the stop power supply instruction received from the master device, stops supply of power to the connected electronic device.

5. The monitoring system of claim 1, wherein the plurality of sensors include two or more of a human sensor, a smoke sensor, and an opening/closing sensor.

6. The monitoring system of claim 1, wherein the master device performs wireless communication with the plurality of sensors and the power controller according to a DECT (Digital Enhanced Cordless Telecommunications) communications protocol.

7. A monitoring method based on a monitoring system, the monitoring system comprising: (a) a plurality of sensors each configured to detect a defined event, (b) a power controller connectable via a plug terminal to an electronic device to supply power or stop supply of power to the electronic device; and (c) a master device that, in operation, performs wireless communication with the plurality of sensors and the power controller and is connected to a fixed telephone network to communicate with other fixed telephones, wherein the master device includes a memory device, the monitoring method comprising:
    receiving, at the master device, operation setting information, via a wireless router, from a smartphone that is communicably connectable to a mobile phone network to communicate with other mobile telephones, wherein the operation setting information defines how the power controller operates in response to a combination of at least two detection signals received from at least two of the sensors having detected at least two defined events,
    storing the operation setting information in the memory device of the master device,
    receiving, at the master device, the at least two detection signals from the at least two of the sensors having detected the at least two defined events,
    transmitting, from the master device that has received the at least two detection signals and according to the operation setting information, a power supply instruction to the power controller, and
    supplying, from the power controller that has received the power supply instruction, power to the connected electronic device.

8. The monitoring method of claim 7, further comprising:
setting, at the master device, the combination of at least two detection signals, in response to which the power supply instruction is transmitted.

9. The monitoring method of claim 8, further comprising:
transmitting, from the master device, a stop power supply instruction to the power controller depending on whether a combination of at least two detection signals received from at least two of the sensors having detected at least two defined events is present or absent, and stopping, at the power controller that has received the stop power supply instruction, supply of power to the connected electronic device.

10. The monitoring method of claim 7, further comprising:
transmitting, from the master device, a stop power supply instruction to the power controller depending on whether a combination of at least two detection signals received from at least two of the sensors having detected at least two defined events is present or absent, and stopping, at the power controller that has received the stop power supply instruction, supply of power to the connected electronic device.

11. The monitoring method of claim 7, wherein the plurality of sensors include two or more of a human sensor, a smoke sensor, and an opening/closing sensor.

12. The monitoring method of claim 7, wherein the master device performs wireless communication with the plurality of sensors and the power controller according to a DECT (Digital Enhanced Cordless Telecommunications) communications protocol.

* * * * *